Feb. 27, 1940.  C. MUELLER  2,192,048
EXPANSION COUPLING
Filed Sept. 11, 1937  2 Sheets-Sheet 1
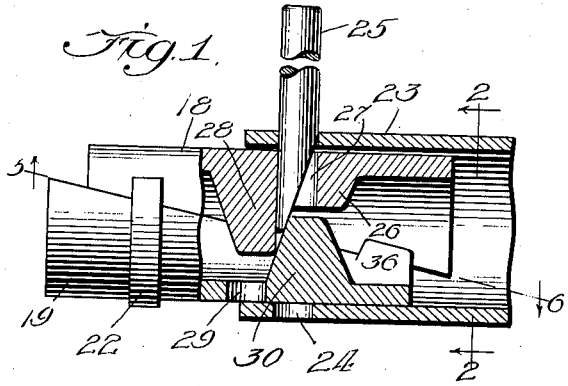
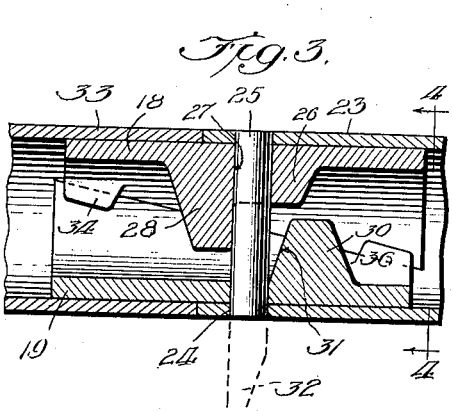
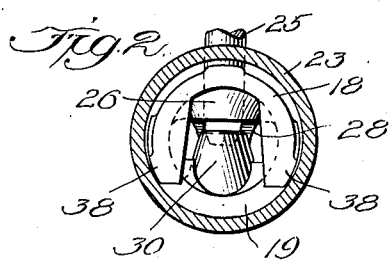
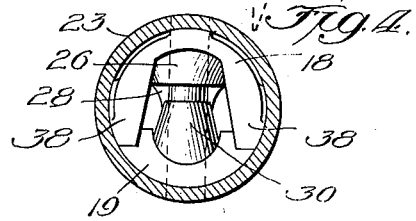
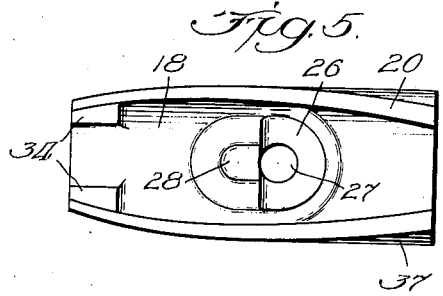
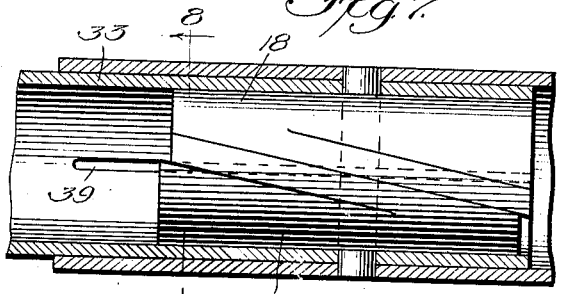
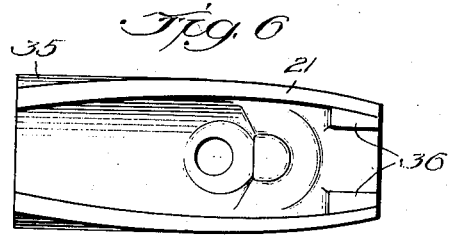
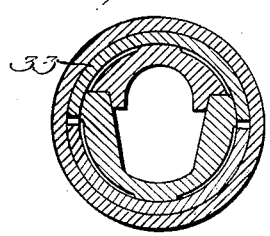
Inventor:
Carl Mueller
by David Heller
Atty Feb. 27, 1940.                C. MUELLER                2,192,048
                          EXPANSION COUPLING
                        Filed Sept. 11, 1937         2 Sheets-Sheet 2
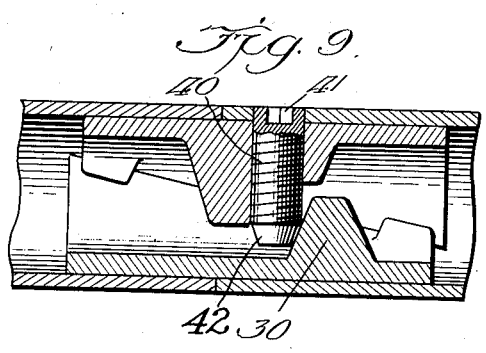
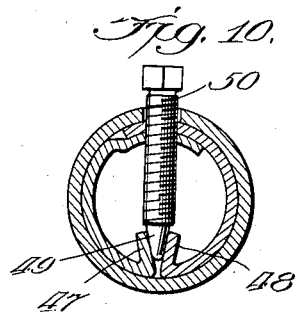
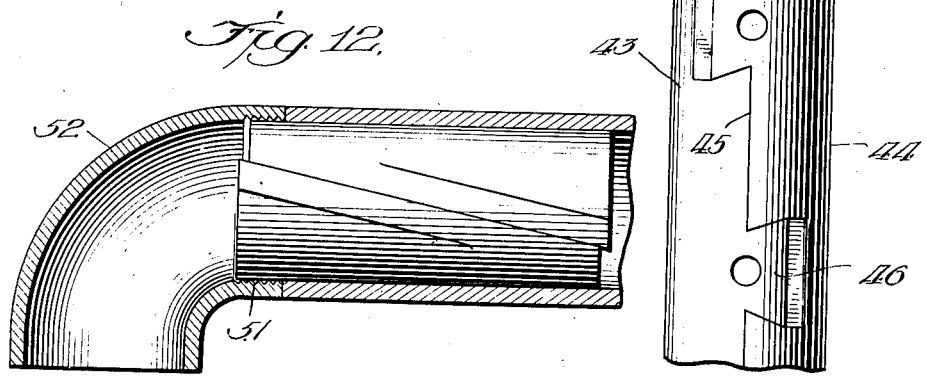
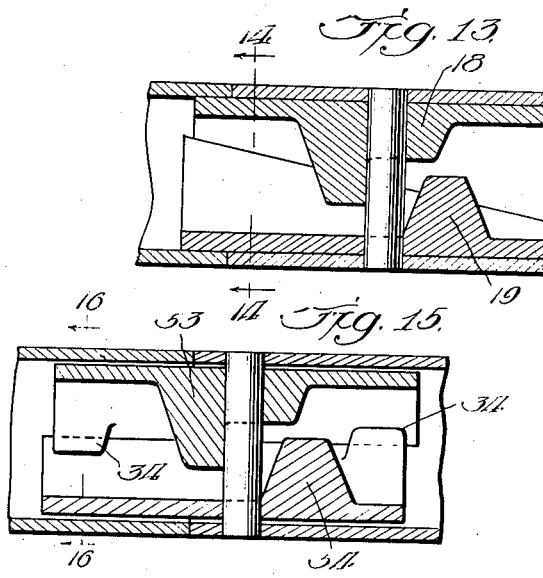
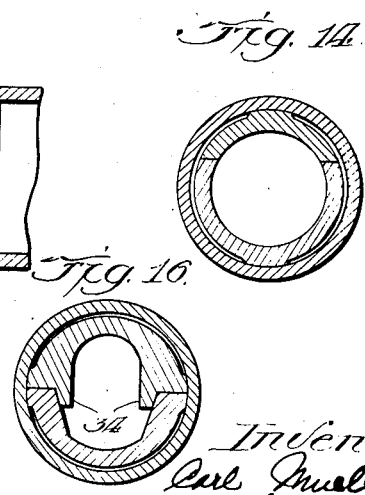
Inventor:
Carl Mueller
by Dan T. Heller Patented Feb. 27, 1940

2,192,048

UNITED STATES PATENT OFFICE 2,192,048

EXPANSION COUPLING

Carl Mueller, Chicago, Ill.

Application September 11, 1937, Serial No. 163,459

4 Claims. (Cl. 287—127)

This invention relates to a coupling adapted to secure and maintain in rigid longitudinal alignment hollow members such as pipes or tubing.

An object of the invention is the provision of a coupling device for hollow or partially hollow objects to be maintained in rigid alignment which is inserted and concealed within the members or objects to be coupled so as to offer no external projections when the coupling engagement is completed.

A further object is to provide a coupling device or mechanism especially adapted for rigidly connecting sections of pipe or tubing, affording an exceptionally strong and effective joint, which is simple in construction and operation and economical to manufacture.

Other objects will appear hereinafter.

Referring to the accompanying drawings wherein are illustrated preferred embodiments of the invention:

Fig. 1 is a vertical longitudinal sectional view of the device, partly in elevation, inserted in one section of pipe or tubing preparatory to positioning of the second section of pipe or tubing and before the parts are brought into final engagement;

Fig. 2 is a cross sectional view taken on the line 2—2 of Fig. 1;

Fig. 3 is a vertical longitudinal sectional view similar to Fig. 1 but with the parts brought into final engagement;

Fig. 4 is a cross sectional view taken on the line 4—4 of Fig. 3;

Fig. 5 is a face view of one of the coupling members, which may be conveniently called the upper member, taken on the line 5 of Fig. 1;

Fig. 6 is a face view of the second coupling member, conveniently termed for reference the lower member, taken on the line 6 of Fig. 1;

Fig. 7 is a vertical longitudinal sectional view of the device in final engaging position in association with two telescoped pipes instead of end abutting relationship as shown in Fig. 3;

Fig. 8 is a cross sectional view taken on the line 8—8 of Fig. 7;

Fig. 9 is a view similar to Fig. 3 employing a threaded member for shifting the coupling members into final juxtaposition or engagement rather than a tapered pin;

Fig. 10 is a cross sectional view of a modified form of the device;

Fig. 11 is a plan view of the modified form shown in section in Fig. 10;

Fig. 12 is a longitudinal sectional view of the device in final engaging position with one section of pipe or tubing and an internally threaded elbow;

Fig. 13 is a sectional view of a further modified form dispensing with the laterally spreading shoulders;

Fig. 14 is a cross sectional view taken on the line 14—14 of Fig. 13;

Fig. 15 is a sectional view of a still further modification dispensing with the inclined or obliquely formed contacting faces, but retaining the spreading shoulders of the coupling members; and Fig. 16 is a cross sectional view taken on the line 16—16 of Fig. 15.

As illustrated in the drawings, the preferred embodiment of the invention comprises an upper coupling member 18 and a lower coupling member 19 which, when brought into cooperative relationship as shown, form a pair of members generally cylindrical in contour in the illustrative embodiment. In order to increase the cross sectional area of the pair of members when slidably adjusted, member 18 has the sides of the shell structure cut to form an oblique face 20 and member 19 is provided with a similarly formed oblique face 21, the pair of members being temporarily held together by a split retaining ring 22 which is removed when the device is put in use. As shown in Fig. 1, the device is inserted in the end of tubular member 23 provided with oppositely positioned openings 24 through which a pin 25 is passed, and member 18 is provided with an inwardly projecting enlarged boss 26 having a pin receiving opening 27 and an elongated pin guide or abutment 28. Similarly, the complementary member 19 is provided with a pin receiving opening 29 adjacent an inwardly extending boss portion 30 having an inclined wall or face 31 against which the tapered end 32 of pin 25 is adapted to be forced for relatively shifting members 18 and 19 into the wedged or swaged position shown in Fig. 3. Prior to this operation, a second tubular section 33 is positioned in alignment with section 23 and by driving pin 25 through the openings as described, the members 18 and 19 are shifted on their contacting faces 20 and 21 to produce and maintain rigid engagement with the interior surfaces of sections 23 and 33, after which the projecting tapered portion 32 of pin 25 is preferably sheared flush with the external surface of section 23. In order to enhance the wedging engagement, member 18 is preferably provided at one end with shoulder portions 34 adapted to slidably contact and spread or expand shell portions 35 of coupling member 19, and the same action occurs between shoulders 36 of member 19 and shell portions 37 of member 18. The wedging action and engagement described is also facilitated by the provision of spaced longitudinally extending ridges 38 on the respective members 18 and 19, to reduce friction and effect a more rigid connection.

Referring to Figs. 7 and 8, the coupling members operate in the same manner, but instead of being placed in abutting alignment, the second tubular section 33 is telescoped within section 23 and to allow for the necessary expansion of section 33, a slot or slots 39 may be provided for a sufficient distance. In the construction shown in Fig. 9, opening 27 of boss 26 is internally threaded to receive screw 40 having a countersunk wrench engaging portion 41 and tapered end 42 adapted to engage boss portion 30. As shown, this arrangement obviates the provision of openings in member 19 and the opposite side of section 23.

In the modification shown in Figs. 10 and 11, the coupling device comprises two semi-cylindrical members 43 and 44 arranged to have relative swinging or hinged movement on line 45 and provided with dovetail projections 46 adapted to move within corresponding recesses of members 43 and 44. The free edges are preferably turned inward to provide slightly spaced flanges 47 and 48 between which tapered end 49 of screw 50 is forced to cause adequate lateral spreading of members 43 and 44, after which the head of screw 50 may be sheared flush with the outer surface of the tubular section as described in connection with the employment of pin 25 in the form shown in Figs. 1 and 3.

The construction shown in Fig. 12 shows the slidable members adapted to engage the inner surface of tubular section 23 and also the internally threaded portion 51 of elbow 52. The enlargement of the cross-sectional area of the coupling device is sufficient to cause the threads of the elbow to cut into the respective coupling members to increase the rigidity of the union, and it will be understood that instead of elbow 52 a section of any desired form may be used.

The structure shown in Figs. 13 and 14 is similar in arrangement and operation to that shown in Figs. 1 and 3 except that the shoulder portions 34 are dispensed with and interior contact with the tubular members 18 and 19, respectively, is established only along the ridged portions 38. In Figs. 15 and 16 is shown a modified form in which the slidably contacting faces of coupling members 53 and 54, respectively, are not obliquely disposed relative to the outer surfaces of the coupling members, and the internal engagement is exerted only by the shoulder portions 34 spreading the shell portions 37. When the coupling members are shaped to form engaging ridges, the final operative engagement is as shown in Fig. 16.

I claim:

1. A device for coupling two hollow sections comprising a pair of coupling members placed interiorly of said sections, a screw member provided with a conical end, an inwardly extending boss upon one of said coupling members provided with a threaded hole for receiving said screw member, the other coupling member being provided with a slant-faced boss adapted to co-act with the conical end of said screw member, a shoulder portion provided on one end of one of said coupling members for engagement with a shell portion provided on one end of the other coupling member, said shoulder and shell portions being alternately disposed on the opposite ends of each of the respective coupling members.

2. A coupling device adapted to fit within the ends of hollow tube sections to join the same; comprising, a hollow cylindrical unit divided into two shell parts on a plane passing thru the ends of the unit and oblique to the axis thereof, shoulder portions on one of said shell parts engaging the inner wall of the other shell part, and means engaging the shell parts to shift the same longitudinally relative to each other, whereby the effective transverse dimensions of said shell parts are increased in directions at angles to each other.

3. A coupling device adapted to fit within the ends of hollow tube sections to join the same; comprising, a hollow cylindrical unit divided into two shell parts on a plane passing thru the ends of the unit and oblique to the axis thereof, shoulder portions on one of said shell parts engaging the inner wall of the other shell part, means engaging the shell parts to shift the same longitudinally relative to each other, whereby the effective transverse dimensions of said shell parts are increased in directions at angles to each other; and two tube sections, one of said tube sections secured in positive engagement with the said cylindrical unit by virtue of the said shifting means, the other tube section secured frictionally to the said cylindrical unit.

4. A coupling device adapted to fit within the ends of hollow tube sections to join the same; comprising, a hollow cylindrical unit divided into two shell parts on a plane passing thru the ends of the unit and oblique to the axis thereof, shoulder portions on one of said parts engaging the inner wall of the other shell part, and means engaging the shell parts to shift the same longitudinally relative to each other, the said shifting means comprising, an inwardly extending boss upon one of said shell parts provided with a pin guide, a boss upon the other shell part having an inclined face, and a round shifting pin tapered at one end, and adapted to be forced adjacent to the said pin guide for engagement with the said inclined face, whereby the effective transverse dimensions of said shell parts are increased in directions at angles to each other.

CARL MUELLER.